United States Patent
Oras et al.

(10) Patent No.: US 12,392,259 B2
(45) Date of Patent: Aug. 19, 2025

(54) ADDITIVELY MANUFACTURED PROTECTIVE COVER FOR GAS TURBINE COMPONENTS

(71) Applicant: Chromalloy Gas Turbine LLC, Palm Beach Gardens, FL (US)

(72) Inventors: Zachary Oras, Riverview, FL (US); Logan Mitchell, Tampa, FL (US); Zachary Ezzo, Tampa, FL (US); Zachary Hopkins, San Diego, CA (US)

(73) Assignee: Chromalloy Gas Turbine LLC, Palm Beach Gardens, FL (US)

( * ) Notice: Subject to any disclaimer, the term of this patent is extended or adjusted under 35 U.S.C. 154(b) by 0 days.

(21) Appl. No.: 18/491,574

(22) Filed: Oct. 20, 2023

(65) Prior Publication Data

US 2025/0129725 A1    Apr. 24, 2025

(51) Int. Cl.
*F01D 25/28* (2006.01)
*B33Y 80/00* (2015.01)

(52) U.S. Cl.
CPC ............ *F01D 25/285* (2013.01); *B33Y 80/00* (2014.12); *F05D 2260/02* (2013.01)

(58) Field of Classification Search
CPC ........ F01D 5/147; F01D 25/285; F01D 5/141; B33Y 80/00; F05D 2260/02
See application file for complete search history.

(56) References Cited

U.S. PATENT DOCUMENTS

| | | |
|---|---|---|
| 3,871,611 A | 3/1975 | Taketa |
| 4,288,313 A | 9/1981 | Bormke et al. |
| 4,321,010 A | 3/1982 | Wilkinson et al. |
| 4,480,956 A * | 11/1984 | Kruger ............ F01D 5/20 416/241 B |
| 5,846,036 A | 12/1998 | Mizoguchi |
| 6,782,940 B2 | 8/2004 | Billiet et al. |
| 7,066,799 B2 | 6/2006 | Oussaada et al. |
| 7,413,001 B2 | 8/2008 | Wang et al. |
| 8,807,931 B2 * | 8/2014 | Roberts .......... F01D 5/147 428/296.7 |

(Continued)

FOREIGN PATENT DOCUMENTS

| | | |
|---|---|---|
| CN | 102566495 A | 7/2012 |
| CN | 206701571 U | 12/2017 |

(Continued)

OTHER PUBLICATIONS

Extended European Search Report, dated Nov. 6, 2024, issued in European Application No. 23214046.7.

(Continued)

*Primary Examiner* — Michael L Sehn
(74) *Attorney, Agent, or Firm* — AVEK IP, LLC

(57) ABSTRACT

A cover is provided for covering at least a portion of a component for finishing. The cover has a top portion, a bottom portion, and at least one wall extending from the top portion to the bottom portion. The cover includes a chamber accessible via the bottom portion. The chamber is configured to retain the component such that at least a portion of the component is protected by the cover. The chamber includes a first stop and a second stop each extending into the chamber. The first stop and the second stop are disposed in different vertical planes. The cover is additively manufactured using an elastomeric material.

17 Claims, 10 Drawing Sheets

(56) References Cited

U.S. PATENT DOCUMENTS

| | | | |
|---|---|---|---|
| 9,089,999 B2 | 7/2015 | Dean | |
| 9,506,350 B1 * | 11/2016 | Memmen | F01D 5/147 |
| 9,506,357 B1 | 11/2016 | Bassett | |
| 9,844,897 B2 * | 12/2017 | Lowth | F01D 5/005 |
| 9,845,694 B2 * | 12/2017 | Hagan | F01D 5/147 |
| 11,048,829 B2 | 6/2021 | Stump | |
| 11,629,424 B2 | 4/2023 | Whitton et al. | |
| 11,806,894 B2 | 11/2023 | Dodds et al. | |
| 11,926,919 B2 | 3/2024 | Whitton et al. | |
| 12,103,197 B2 | 10/2024 | Dodds et al. | |
| 2001/0008323 A1 | 7/2001 | Reed et al. | |
| 2002/0187065 A1 | 12/2002 | Amaya et al. | |
| 2003/0024825 A1 | 2/2003 | Lamphere et al. | |
| 2005/0205644 A1 * | 9/2005 | Meier | F01D 5/147 |
| | | | 228/47.1 |
| 2006/0085979 A1 | 4/2006 | Bayer et al. | |
| 2007/0039178 A1 | 2/2007 | Bladon | |
| 2011/0239934 A1 | 10/2011 | Soucy et al. | |
| 2012/0291983 A1 | 11/2012 | Graham et al. | |
| 2013/0174923 A1 | 7/2013 | Bellino et al. | |
| 2013/0220571 A1 | 8/2013 | Mueller et al. | |
| 2014/0242278 A1 | 8/2014 | Hlavaty et al. | |
| 2015/0096713 A1 | 4/2015 | Marcin | |
| 2017/0197359 A1 | 7/2017 | Yang et al. | |
| 2018/0333824 A1 | 11/2018 | Strzyzewski et al. | |
| 2019/0015893 A1 | 1/2019 | Breneman et al. | |
| 2019/0329488 A1 | 10/2019 | Ravich et al. | |
| 2021/0276077 A1 | 9/2021 | Hearon et al. | |
| 2021/0388522 A1 | 12/2021 | Whitton et al. | |
| 2022/0146043 A1 | 5/2022 | Depalma et al. | |
| 2023/0183878 A1 | 6/2023 | Whitton et al. | |
| 2023/0415375 A1 | 12/2023 | Dodds et al. | |
| 2024/0191386 A1 | 6/2024 | Whitton et al. | |
| 2024/0426019 A1 | 12/2024 | Hopkins | |
| 2025/0108482 A1 | 4/2025 | Hopkins et al. | |
| 2025/0129725 A1 | 4/2025 | Oras et al. | |
| 2025/0178025 A1 | 6/2025 | Oras et al. | |
| 2025/0179681 A1 | 6/2025 | Hopkins et al. | |

FOREIGN PATENT DOCUMENTS

| | | |
|---|---|---|
| CN | 108819049 A | 11/2018 |
| CN | 119159100 A | 12/2024 |
| CN | 120099609 A | 6/2025 |
| CN | 120100533 A | 6/2025 |
| EP | 0925845 A2 | 6/1999 |
| EP | 3351652 A1 | 7/2018 |
| EP | 4488426 A1 | 1/2025 |
| EP | 4530018 A1 | 4/2025 |
| EP | 4566722 A1 | 6/2025 |
| EP | 4567163 A1 | 6/2025 |
| KR | 200353432 Y1 | 6/2004 |
| WO | 2019132912 A1 | 7/2019 |

OTHER PUBLICATIONS

Extended European Search Report, dated Apr. 22, 2025, 7 pages, issued in EP Patent Application No. 24217868.9.

Extended European Search Report, dated Apr. 30, 2025, 9 pages, issued in European Patent Application No. 24217895.2.

Extended European Search Report, dated Dec. 11, 2024, 9 pages, issued in EP Patent Application No. 24170432.9.

Extended European Search Report, dated Feb. 20, 2025, 7 pages, issued in European Patent Application No. 24203188.8.

* cited by examiner

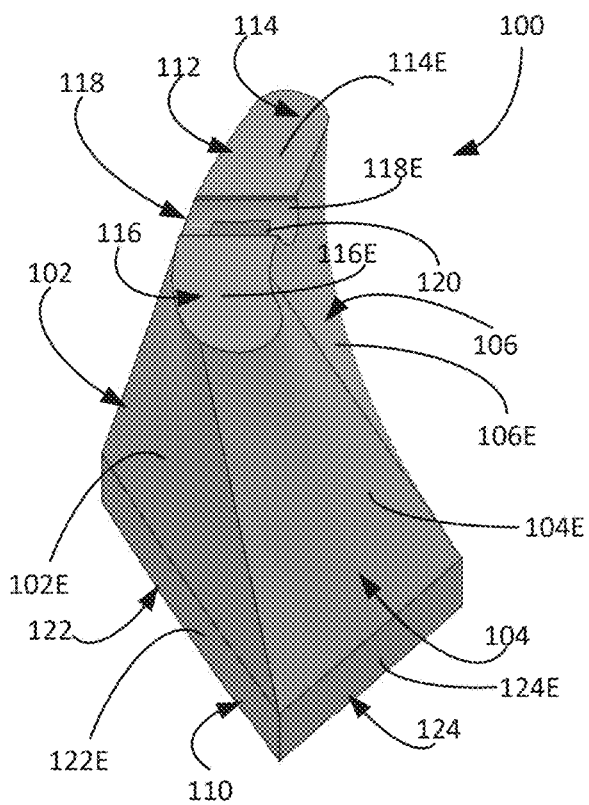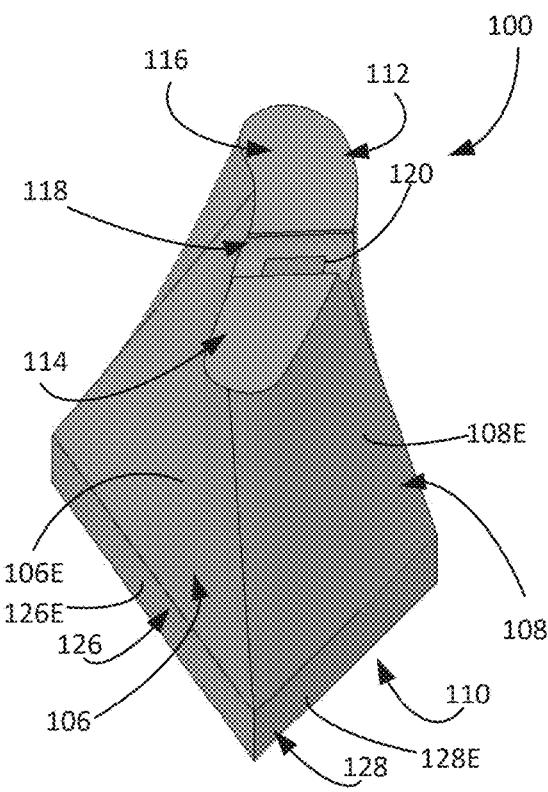
FIG. 3A
FIG. 3B
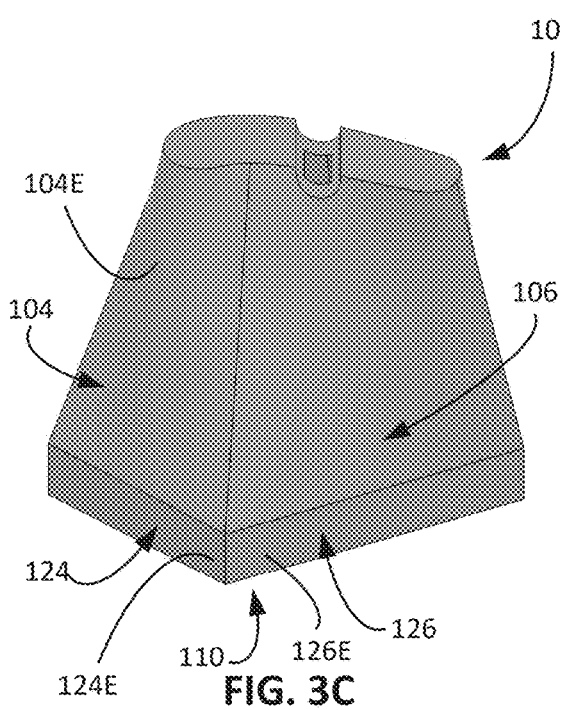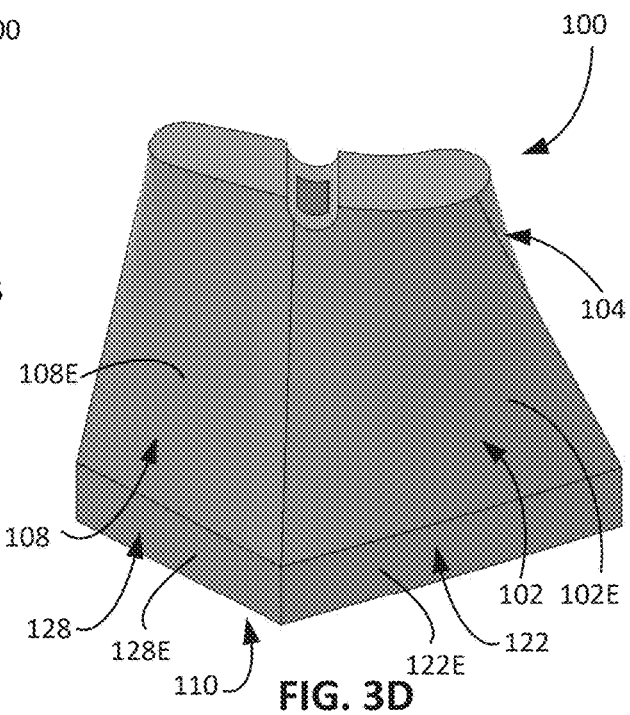
FIG. 3C
FIG. 3D

ADDITIVELY MANUFACTURED PROTECTIVE COVER FOR GAS TURBINE COMPONENTS

CROSS REFERENCE TO RELATED APPLICATIONS

None.

FIELD OF THE DISCLOSURE

The disclosure relates generally to the field of protective covers. More specifically, the disclosure relates to an additively manufactured cover for protecting a gas turbine component.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In an aspect of the disclosure, a cover for a component is disclosed. The cover includes a top portion, a bottom portion, and at least one wall extending from the top portion to the bottom portion. The cover includes a chamber accessible via the bottom portion. The chamber is configured to retain the component such that at least a part of the component is protected by the cover. The chamber includes a first stop and a second stop each extending into the chamber. The first stop and the second stop are disposed in different vertical planes. The cover includes an elastomeric material.

In an aspect, according to any one of the preceding aspects, each of the first stop and the second stop are disposed on the bottom portion.

In an aspect, according to any one of the preceding aspects, the first stop includes a first lower stop and a second lower stop. The first lower stop faces the second lower stop.

In an aspect, according to any one of the preceding aspects, the second stop includes a first upper stop and a second upper stop. The first upper stop faces the second upper stop.

In an aspect, according to any one of the preceding aspects, the at least one wall includes a plurality of walls. Each of the first lower stop, the second lower stop, the first upper stop, and the second upper stop are disposed on a different one of the plurality of walls.

In an aspect, according to any one of the preceding aspects, the first stop is configured to contact the component to preclude the component from falling out of the cover.

In an aspect, according to any one of the preceding aspects, the second stop is configured to contact the component to maintain a distance between the component and the top portion.

In an aspect, according to any one of the preceding aspects, the component is a gas turbine component and the cover is additively manufactured.

In an aspect, according to any one of the preceding aspects, the gas turbine component is one of a blade and a vane.

In an aspect, according to any one of the preceding aspects, the at least one wall includes four walls.

In an aspect, according to any one of the preceding aspects, the top portion includes a first section, a second section, and a recessed portion between the first section and the second section.

In an aspect, according to any one of the preceding aspects, the recessed portion includes a cutout and at least one of the first section and the second section is frusto-ovalur.

In an aspect, according to any one of the preceding aspects, the bottom portion includes a parallelogram configuration.

In an aspect, according to any one of the preceding aspects, the at least one wall includes ribbing.

In an aspect, an additively manufactured cover for a blade of a gas turbine is provided. The cover includes a top portion corresponding to the tip of the blade, a bottom portion, and at least one wall extending from the top portion to the bottom portion. The cover has a chamber accessible via the bottom portion. The chamber is configured to retain the blade such that at least a part of the blade is protected by the cover. The cover has a first stop and a second stop each extending into the chamber. The first stop and the second stop are disposed in different vertical planes.

In an aspect, according to any one of the preceding aspects, the at least a part of the blade protected by the cover includes an airfoil and a gas path surface of a platform of the blade.

In an aspect, according to any one of the preceding aspects, the first stop includes a first lower stop and a second lower stop. The first lower stop facing the second lower stop.

In an aspect, according to any one of the preceding aspects, the second stop is configured to maintain a distance between the tip of the blade and the top portion.

In an aspect, according to any one of the preceding aspects, when the blade is retained in the chamber, a dovetail of the blade is exposed.

In an aspect, a cover for a gas turbine component includes a top portion having a first section, a second section, and a recessed portion. The cover includes a bottom portion and a plurality of walls extending at an angle from the top portion to the bottom portion. The cover includes a chamber accessible via the bottom portion. The chamber is configured to retain the gas turbine component such that a first part of the component is shielded by the cover and a second part of the component is exposed. The cover includes an elastomeric material.

BRIEF DESCRIPTION OF THE DRAWINGS

Illustrative embodiments of the present disclosure are described in detail below with reference to the attached drawing figures and wherein:

FIGS. 3A through 3D are perspective views of the cover of FIG. 2 with a top portion thereof facing in an upward direction.

DETAILED DESCRIPTION

A gas turbine engine typically includes a multi-stage compressor coupled to a multi-stage turbine via an axial shaft. Air enters the gas turbine engine through the compressor where its temperature and pressure are increased as it passes through subsequent stages of the compressor. The compressed air is then directed to one or more combustors where it is mixed with a fuel source to create a combustible mixture. This mixture is ignited in the combustors to create a flow of hot combustion gases. These gases are directed into the turbine causing the turbine to rotate, thereby driving the compressor. The output of the gas turbine engine can be mechanical thrust via exhaust from the turbine or shaft power from the rotation of an axial shaft, where the axial shaft can drive a generator to produce electricity.

The compressor and turbine each include a plurality of rotating blades and stationary vanes having an airfoil extending into the flow of compressed air or flow of hot combustion gases. Each blade or vane has a particular set of design criteria which must be met to provide the necessary work to the flow passing through the compressor and the turbine. However, due to the severe nature of the operating environment, especially in the turbine, it is often necessary to cool these blades and vanes. The blades and vanes often utilize complex internal cooling passageways in order to maximize the efficiency of cooling fluid passing therethrough.

Figure 1:
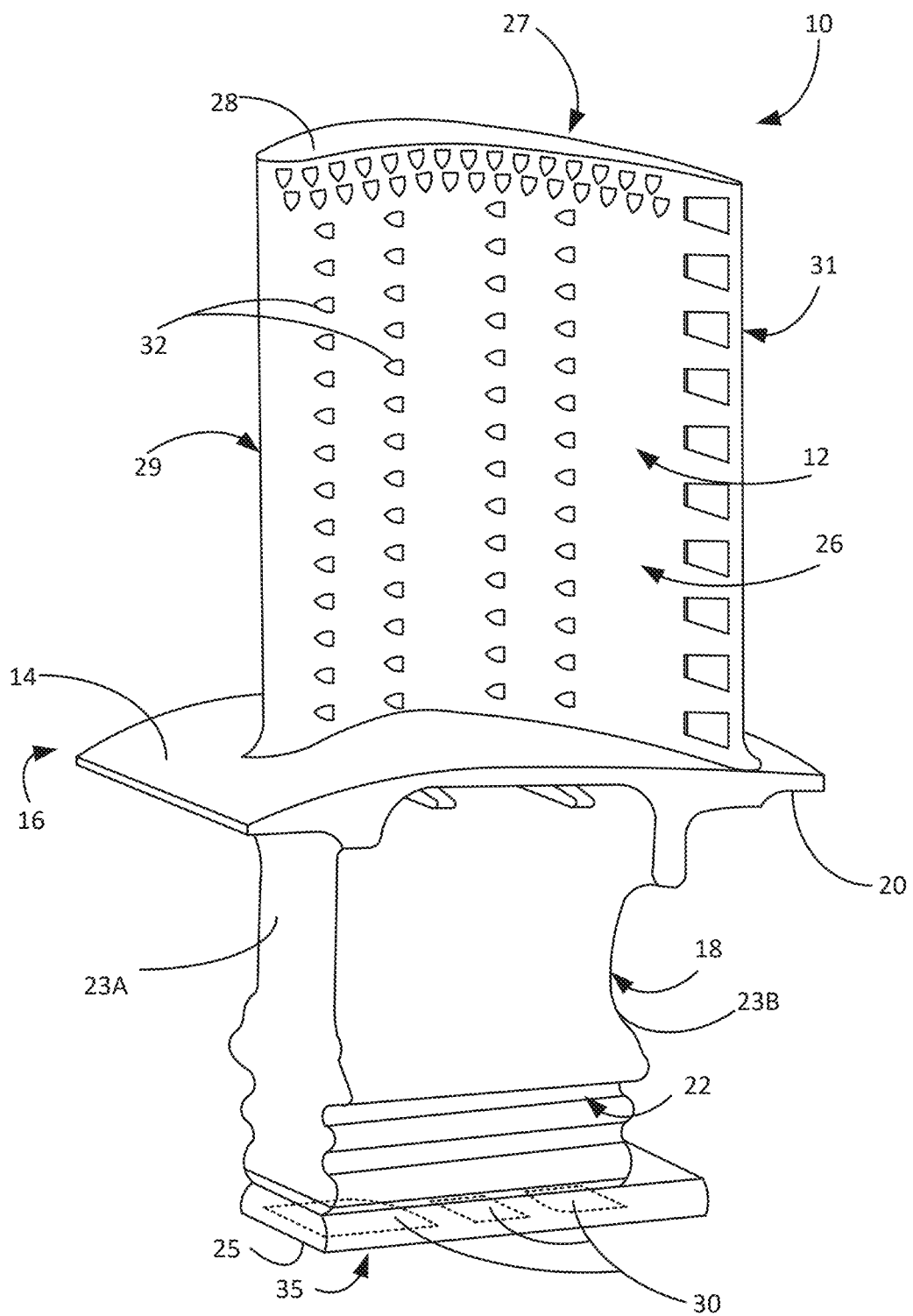
FIG. 1 is a perspective view of a turbine blade.

FIG. 1 shows a gas turbine component, such as a gas turbine blade 10. The turbine blade 10 generally includes an airfoil 12 extending from a top or gas path side surface 14 of a platform 16 and a root fixing portion or "dovetail" 18 depending from an undersurface 20 of the platform 16. The dovetail 18 may include one or more serrations or tangs 22 that extend laterally from one side 23A of the dovetail 18 to an opposing side 23B of the dovetail 18. The dovetail 18 may terminate at a terminal or bottom wall 25 that may span between the dovetail sides 23A and 23B. The dovetail 18, including the tangs 22 and the bottom wall 25 thereof, may be adapted for interlocking engagement in a corresponding slot defined in the periphery of a hub of a turbine rotor. The bottom wall 25 may be part of a metering plate 35 that is brazed or otherwise secured to the dovetail 18.

The airfoil 12 may have a pressure side 26, a suction side 27 opposite the pressure side 26, a tip 28, a leading edge 29, and a trailing edge 31. The tip 28 may include or may be configured to interact with a shroud. The shroud may be provided at the tip 28 of each blade 10, or may be a stationary ring including one or more circumferentially extending sections each connected to the gas turbine casing. The shroud(s) may be configured to seal the gap between the tip 28 of the blade 10 and stationary components (e.g., stators) of the turbine, and thereby, may reduce leakage flow between the rotating and stationary components. The airfoil 12, e.g., the pressure side 26 thereof, may come into contact with combustion gases that are at an extremely high temperature. The airfoil 12 or portions thereof may therefore be coated with heat-resistant, wear-resistant, and/or other coatings. During operation, the tip 28 may rub against the tip shroud, and the tip 28 may therefore additionally or alternately be coated with wear-resistant coatings. In like fashion, one or more other portions of the blade 10 may be coated with different materials depending on the environment in which these portions are located and the stresses encountered thereby.

The bottom wall 25 of the dovetail 18 may include one or more air inlet apertures 30. Further, one or more portions of the blade 10 may include cooling holes 32 for cooling the blade 10 during operation. The cooling holes 32 may be provided on one or more surfaces of the airfoil 12, such as the pressure side 26, the suction side 27, the tip 28, the leading edge 29, the trailing edge 31, or a combination thereof. The cooling holes 32 may be circular cooling holes, diffused (e.g., angled) cooling holes, cooling slots, or take on one or more other regular or irregular shapes. Cooling gas may pass through internal cooling channels (not illustrated for ease of description) in the blade 10 and emerge from the cooling holes 32 to create a blanket of thin film over the outer surface of the airfoil 12, thus preventing direct contact of the hot gases and the surfaces of the blade 10. For example, the illustrated blade 10 has air inlet apertures 30 in the bottom wall 25 of the dovetail 18 and cooling holes 32 on the pressure side 26 of the airfoil 12. The blade 10, including the airfoil 12 thereof, may include hollow interior passages for the passage of cooling air, for example, but not limited to, from air inlet apertures 30 to cooling holes 32. Thus, cooling air may be bled from the compressor and channeled into the air inlet apertures 30. This air may exit out the cooling holes 32 to cool one or more portions of the blade 10 during operation. One having skill in the art will understand that different blades may have differing cooling schemes and that the inlet apertures 30 and cooling holes 32 in FIG. 1 are merely exemplary and not intended to be independently limiting.

A gas turbine blade, such as the blade 10, may be manufactured using investment casting, also referred to in the art as lost-wax processing. The investment casting process may involve making a precise negative die of the blade shape that is filled with wax to form the blade shape. If the blade, such as the blade 10, is hollow and has interior cooling passages, a ceramic core in the shape of the cooling passages may be inserted into the middle. The wax blade may be coated with a heat-resistant material to make a shell, and then that shell may be filled with the blade alloy.

Once cast, the blade 10 may undergo one or more finishing processes to prepare the blade 10 for operation. The finishing processes may ensure that the blade 10 has the required aerodynamic profile, as such may impact engine efficiency and fuel consumption. The finishing processes may also make the blade 10 more resistant to fatigue, and thereby increase the lifespan of the blade 10. Some finishing processes may reduce the maintenance requirements associated with the blade 10.

Finishing the blade 10 may include coating one or more surfaces of the blade 10. For example, one or more surfaces of the blade 10 may be blasted with abrasive media to configure these surfaces to accept coatings, and thereafter, heat-resistant, wear-resistant, and/or other coatings may be applied to these surfaces of the blade 10. Finishing the blade 10 may also include deburring and breaking sharp edges, polishing one or more surfaces of the blade 10 to remove excess material, welding, brazing or otherwise associating a feature (e.g., the metering plate 35) with the blade 10, machining one or more surfaces of the blade 10, and so on. The term "finishing" and the phrase "surface finishing", as used herein, includes any one of the one or more processes that may be used to alter a manufactured component to cause it to achieve a certain property. For example, finishing the blade 10 includes the one or more processes undergone by the blade 10 (e.g., media blasting, brazing, coating, machining, et cetera) after it is cast to prepare the blade 10 for operation in a gas turbine.

To finish a gas turbine component after it is manufactured, e.g., to finish the blade 10 after it is cast, the component may be transported to one or more locations (e.g., one or more locations in the manufacturing facility). For example, the blade 10 may be transported by an operator or via one or more mechanized systems such as a conveyer belt from one finishing station to another. For instance, the blade 10, after it is cast, may be taken to a first station for media blasting, to a second station for applying a coating to the pressure side 26, to a third station for applying a coating to the tip 28, to a fourth station for machining, to a fifth station for brazing the metering plate 35 onto the blade 10, and so on. These stations may be in the same facility or in different facilities. After the blade 10 is finished, it may be transported to yet another station or location for packaging and shipping. It may be prudent to exercise care as the component (e.g., the blade 10) is taken from one location to another location (e.g., from one station to another station). If the blade 10 is damaged while it is being handled during a finishing process and/or transported from one location to another (hereinafter "handling damage"), the blade 10 may have to be repaired, and in some cases, the blade 10 may have to be scrapped.

In addition to handling damage, a component, such as a blade 10, may incur damage from foreign material contamination. For example, braze material being used to braze the metering plate 35 onto the dovetail 18 of the blade 10 may accidentally contact a surface of the platform 16 or the airfoil 12 and cause damage to the blade 10. Or, for instance, a coating to be applied only to the tip 28 of the blade 10 may accidentally contact the pressure side 26 or the suction side 27 of the airfoil 12. Like handling damage, damage to the component due to foreign material contamination may require that the component be repaired prior to use or scrapped entirely. The requirement to repair or replace a component due to such inadvertent damage (e.g., handling damage, foreign contamination damage, or other such damage) may be time consuming, laborious, and expensive. It may be beneficial to preclude or minimize the likelihood of damaging a component after one or more initial manufacturing steps have been completed and before the component is finished. Aspects of the present disclosure may provide a cover for protecting the component from damage during finishing.

Focus is directed to FIG. 2, which shows a protective cover (or mask, sheath, or jacket, hereinafter "cover") 100, according to an aspect of the disclosure. The cover 100 may cover (e.g., envelope) one or more portions of the blade 10 and protect the blade 10 from incurring damage, such as during finishing thereof. In the embodiment illustrated in FIG. 2, the cover 100 is shown covering and protecting the airfoil 12 (i.e., each of the pressure side 26, suction side 27, tip 28, leading edge 29, and trailing edge 31) and the gas path side surface 14 of the platform 16. In other examples of the disclosure, a cover may protect one or more other surfaces of the blade 10 or another component (such as a gas turbine vane or other component).

In an embodiment, the cover 100 may be additively manufactured. Additive manufacturing, also referred to as 3D printing, may be performed by dividing the shape of a three-dimensional object, i.e., the cover 100 in this example, into a number of two-dimensional cross sections having a uniform or variable thickness, and forming the two-dimensional cross sections to be stacked one by one. There are several known additive printing methods such as a material extrusion method, a material jetting method, a binder jetting method, a sheet lamination method, a vat photo-polymerization method, a powder bed fusion method, a directed energy deposition (DED) method, et cetera. Any one or more of these methods, or any other additive manufacturing method, now known or hereinafter developed, may be employed to manufacture cover 100.

In some non-limiting examples, cover 100 may be manufactured using vat photo-polymerization. Vat photopolymerization, such as stereolithography, direct light processing, continuous liquid interface production, solid ground curing, et cetera, is a category of additive manufacturing processes that create three dimensional objects by selectively curing material (e.g., resin or other photopolymers) through targeted light-activated polymerization. When exposed to certain wavelengths of light, the liquid photopolymers' molecules may rapidly bind together and cure into a solid state through a process called photopolymerization. The liquid photopolymer(s) may be held in a container or vat with the build platform partially submerged near the surface of the liquid. Using the information supplied by a CAD or other design file, the printer may direct a light source to selectively cure the liquid photopolymer into a solid layer. Then the build platform may then be re-submerged into the remaining resin and the process may be repeated for the next layers until the cover 100 has been fully printed.

Figure 6A:
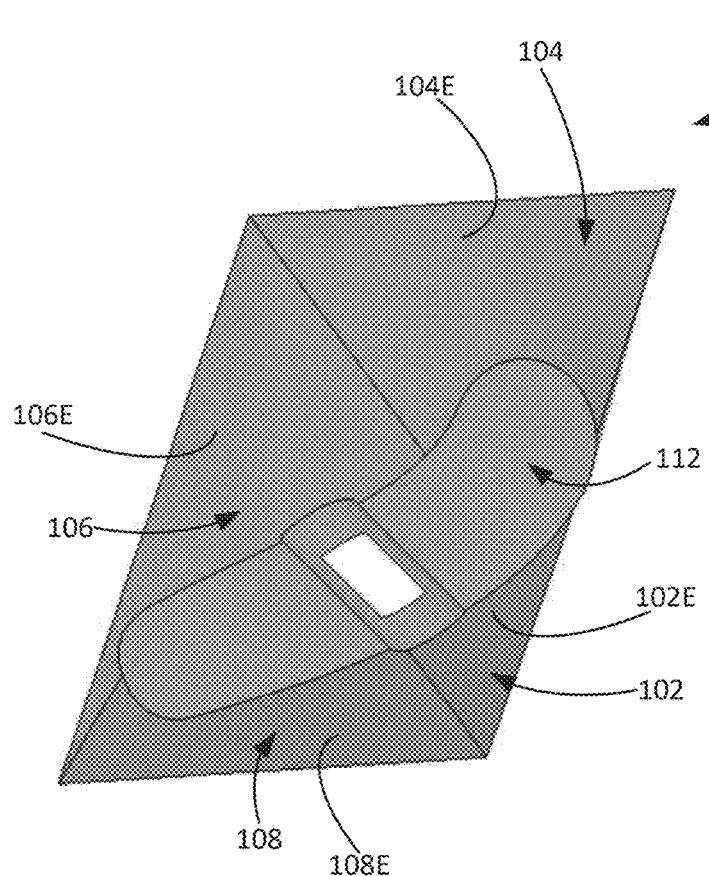
FIGS. 6A and 6B are top views of the cover of FIG. 2.
Figure 6B:
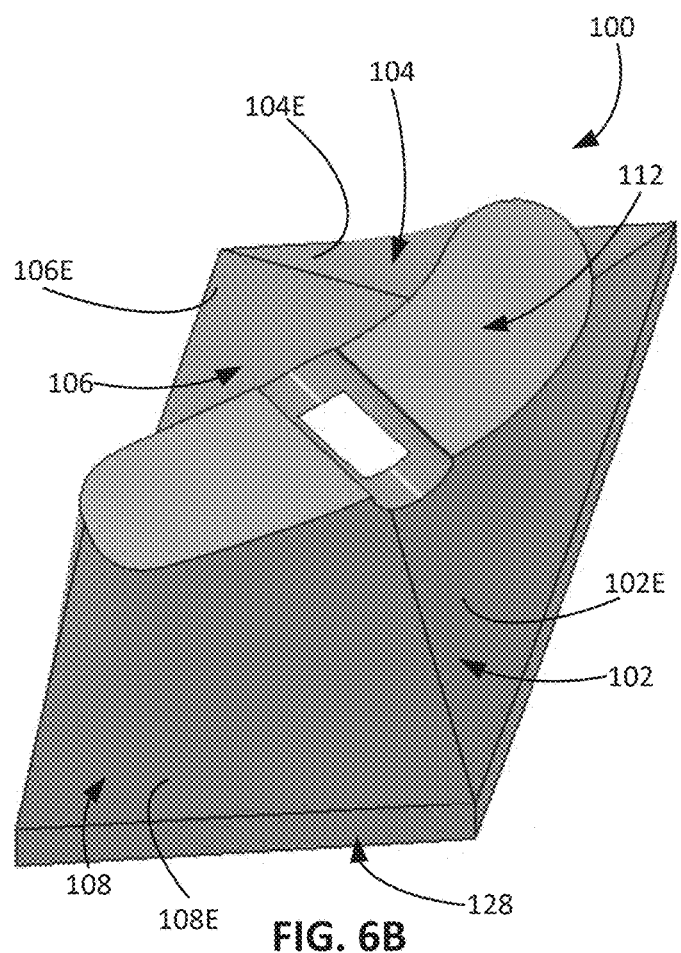

FIGS. 3A through 3D and 4A through 4D show the cover 100 in more detail. In some examples of the disclosure, the cover 100 may have a first wall 102, a second wall 104, a third wall 106, a fourth wall 108, a bottom portion 110, and a top portion 112 (see also FIG. 6). Each of the first wall 102, the second wall 104, the third wall 106, and the fourth wall 108 may extend from the bottom portion 110 to the top portion 112. The first wall 102 may be disposed at one side of the second wall 104 and the third wall 106 may be disposed on the other side of the second wall 104. Similarly, the first wall 102 may be disposed at one side of the fourth wall 108 and the third wall 106 may be disposed on the other side of the fourth wall 108.

In some examples of the disclosure, one or more of the first wall 102, the second wall 104, the third wall 106, and the fourth wall 108 may extend from the bottom portion 110 to the top portion 112 at an angle (e.g., an acute angle as shown or an obtuse angle). In aspects of the disclosure, the first wall 102, the second wall 104, the third wall 106, and the fourth wall 108 may collectively be generally frusto-pyramidal. The angle at which the first wall 102, the second wall 104, the third wall 106, and the fourth wall 108 extend from the bottom portion 110 to the top portion 112 may generally depend on the geometry of the part for which the cover 100 is intended. Further, cover 100 with walls 102, 104, 106, and 108 that extend from the bottom portion 110 to the top portion 112 at an angle (e.g., an acute angle) may require less material to manufacture relative to a cover where the walls vertically extend from the bottom portion to the top portion.

Each of the first wall 102, the second wall 104, the third wall 106, and the fourth wall 108 may have an exterior or outer surface 102E, 104E, 106E, and 108E, respectively. Each of the first wall 102, the second wall 104, the third wall 106, and the fourth wall 108 may likewise have an interior or inner surface 102I, 104I, 106I, and 108I, respectively. The exterior surfaces 102E, 104E, 106E, and 108E may respectively oppose the interior surfaces 102I, 104I, 106I, and 108I.

In some examples, the top portion 112 may have a first section 114 and a second section 116 with a recessed portion 118 therebetween. The first section 114, the second section 116, and the recessed portion 118 may each have an exterior surface 114E, 116E, and 118E, and an interior surface 114I, 116I, and 118I, respectively. In some examples, each of the first section 114 and the second section 116 may be generally frusto-ovalur. In other embodiments, the first section 114 and/or the second section 116 may be pyramidal, spherical, or take on other regular or irregular shapes. In some examples, the first section 114 and/or the second section 116 may be curved such that the first section 114, the second section 116, and the recessed portion 118 collectively generally correspond to the shape of the tip 28 of the blade 10.

In some examples of the disclosure, the recessed portion 118 of the top portion 112 may have a generally concave shape. In other examples, the recessed portion 118 may take on other regular or irregular shapes. The recessed portion 118 may have cutout or opening 120. The recessed portion 118, including the cutout 120 thereof, may reduce the total material required to additively manufacture the cover 100. Further, the recessed portion 118 may facilitate printing of the cover 100, e.g., using vat photopolymerization. Specifically, the recessed portion 118 and the cutout 120 may reduce the likelihood of formation of suction cups that may otherwise form when additively manufacturing the cover 100 using vat photopolymerization. These suction cups, if formed, may impede flow of material during the additive manufacturing process and may cause the walls of the cover 100 to cavitate during the additive manufacturing process. The recessed portion 118, including the cutout 120 therein, may preclude the formation of these suction cups and may allow liquid to flow freely during the vat photopolymerization process, thereby facilitating additive printability.

The bottom portion 110, in some examples of the disclosure, may be generally a parallelogram. In other examples, the bottom portion 110 may be generally rectangular, triangular, or take on other regular or irregular shapes. In the illustrated example, the bottom portion 110 has four walls 122, 124, 126, and 128. Bottom portion wall 122 may extend from and below first wall 102, bottom portion wall 124 may extend from and below second wall 104, bottom portion wall 126 may extend from and below third wall 106, and bottom portion wall 128 may extend from and below fourth wall 108. Each bottom portion wall 122, 124, 126, and 128 may have an interior surface 122I, 124I, 126I, and 128I, and an exterior surface 122E, 124E, 126E, and 128E, respectively. The exterior surfaces 122E, 124E, 126E, and 128E of the bottom portion walls may respectively oppose the interior surfaces 122I, 124I, 126I, and 128I thereof.

Figure 5A:
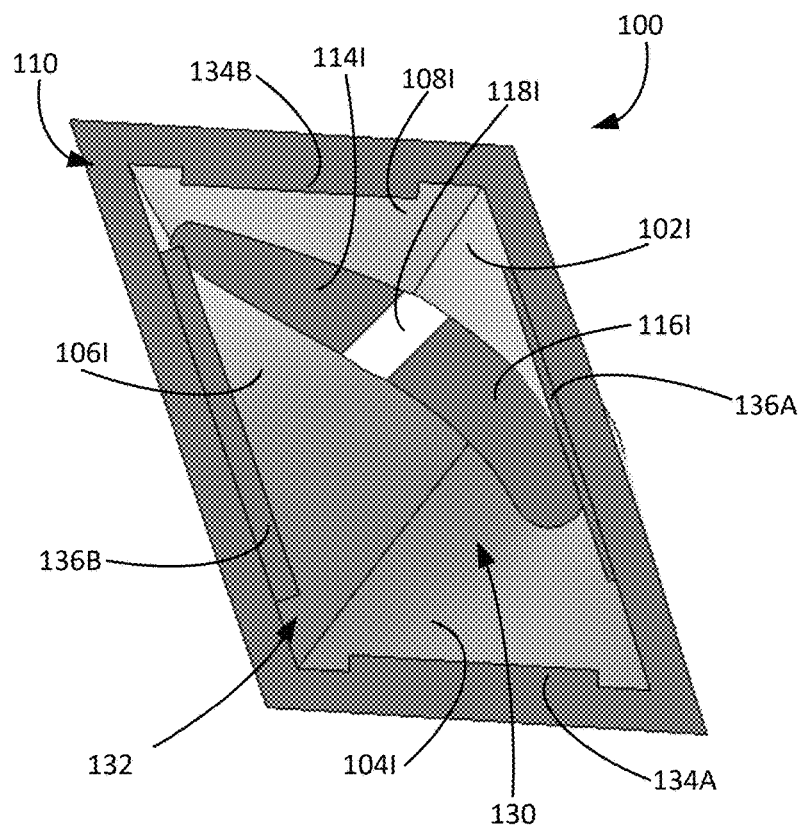
FIGS. 5A and 5B are bottom view of the cover of FIG. 2.
Figure 5B:
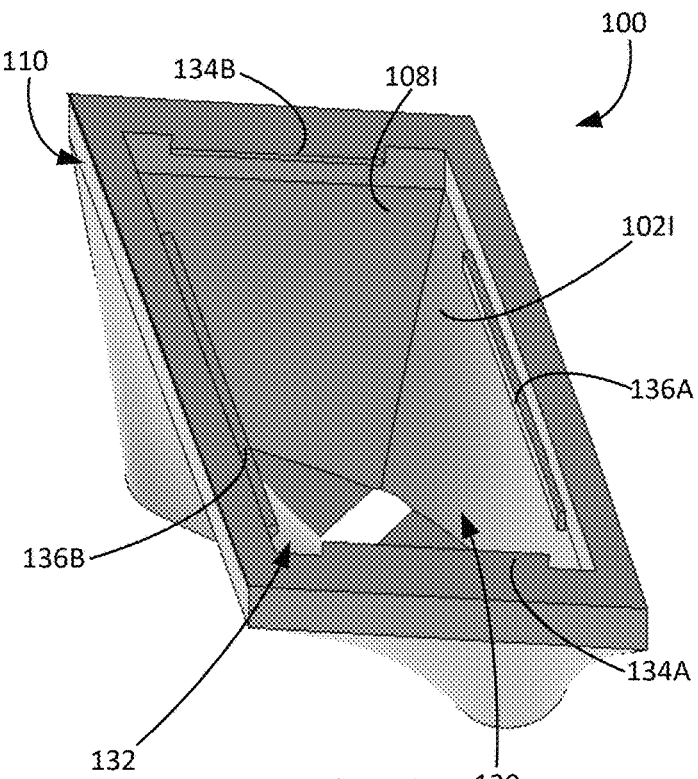

The first wall, 102, the second wall 104, the third wall 106, the fourth wall 108, the bottom portion 110, and the top portion 112, may collectively define a chamber 130 (FIG. 5). Specifically, the interior surfaces 102I, 104I, 106I, and 108I, of the first wall 102, the second wall 104, the third wall 106, the fourth wall 108, the interior surfaces of the top portion 112 (i.e., the interior surfaces 114I, 116I, and 118I of the first section 114, the second section 116, and the recessed portion 118), and the interior surfaces 122I, 124I, 126I, and 128I of the walls 122, 124, 126, and 128 of the bottom portion 110, may collectively define the chamber 130. In some examples, the shape of the chamber 130 may be generally frusto-pyramidal. In other examples, the chamber 130 may generally be spherical, cylindrical, cuboidal, or take on other symmetrical or non-symmetrical shapes. In some examples, the shape of the chamber 130 may loosely correspond to the shape of the portion of the component (the airfoil 12 of the blade 10 in this example) to be protected by the cover 100. The interior surfaces 122I, 124I, 126I, and 128I of the walls 122, 124, 126, and 128 of the bottom portion 110 may define an entryway 132 via which the chamber 130 may be accessed.

In an aspect of the disclosure, the interior surfaces 122I, 124I, 126I, and 128I of the bottom portion 110 may include two pairs of stops or shelves. Specifically, the interior surface 124I of the bottom portion wall 124 may have a lower stop 134A (FIG. 4B) and the interior surface 128I of the bottom portion wall 128 may have a lower stop 134B (FIG. 4D). The lower stops 134A and 134B may also be referred to herein as a "release prevention stops" 134A and 134B. The lower stop 134A may face and be coplanar with the lower stop 134B.

Figure 4A:
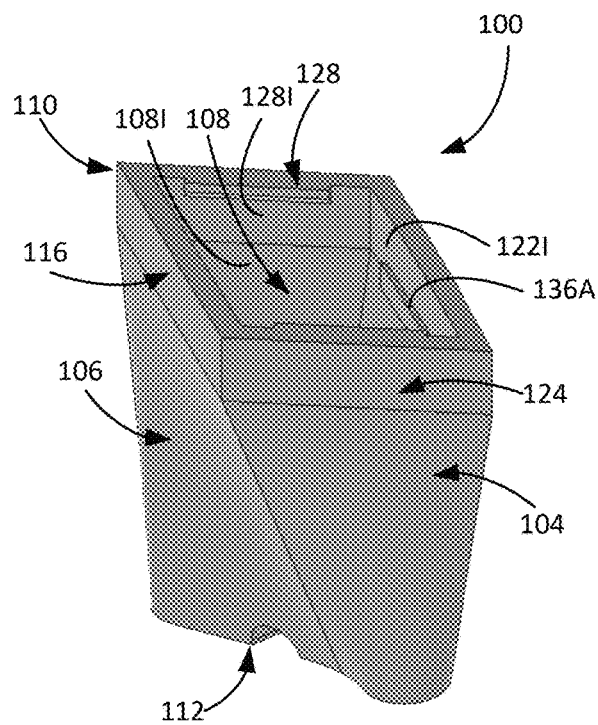
FIGS. 4A through 4D are perspective views of the cover of FIG. 2 with a top portion thereof facing in a downward direction.
Figure 4B:
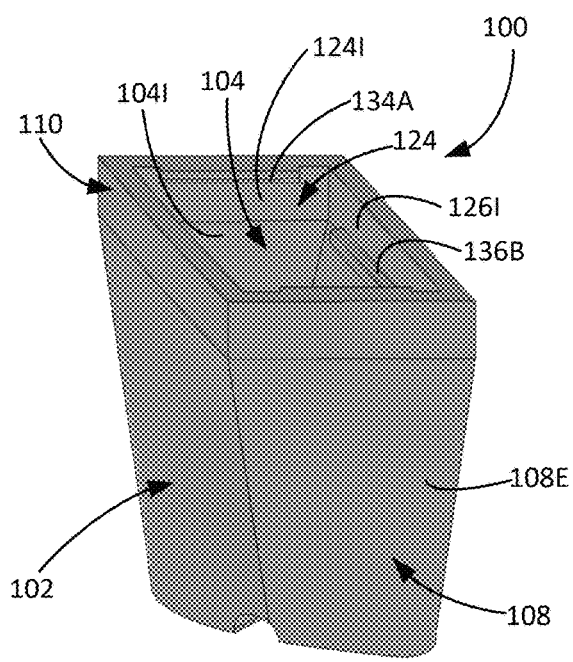
Figure 4C:
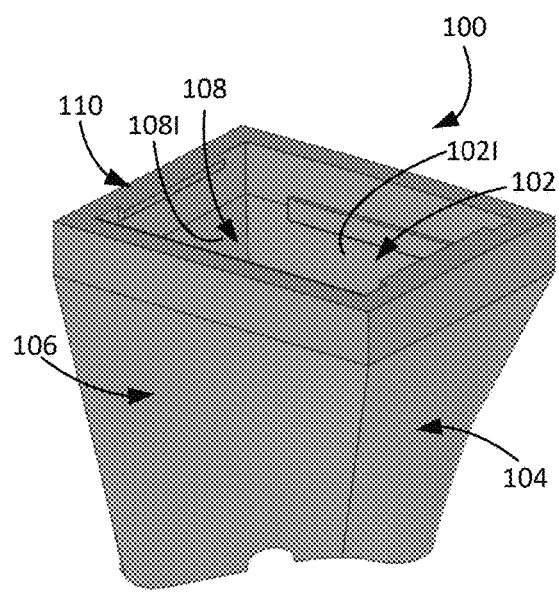
Figure 4D:
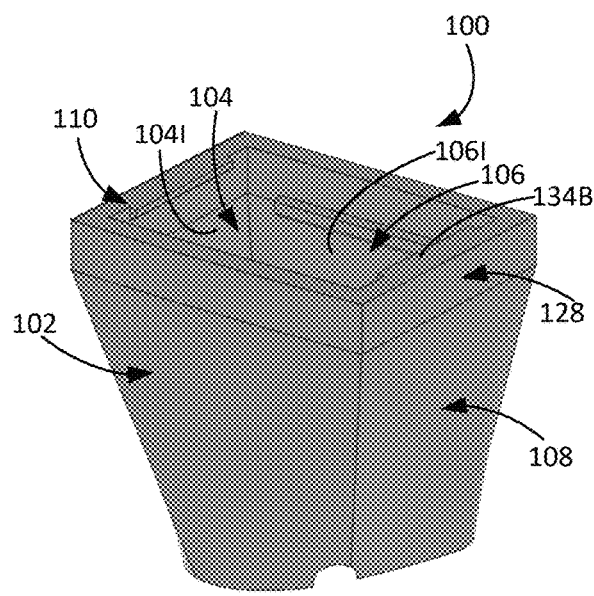

The interior surface 122I of the bottom portion wall 122 may have an upper stop 136A (FIG. 4A) and the interior surface 126I of the bottom portion wall 126 may have an upper stop 136B (FIG. 4B). The upper stops 136A and 136B may also be referred to herein as "over-insertion prevention stops" 136A and 136B. The upper stop 136A may face and be coplanar with the upper stop 136B.

Figure 7A:
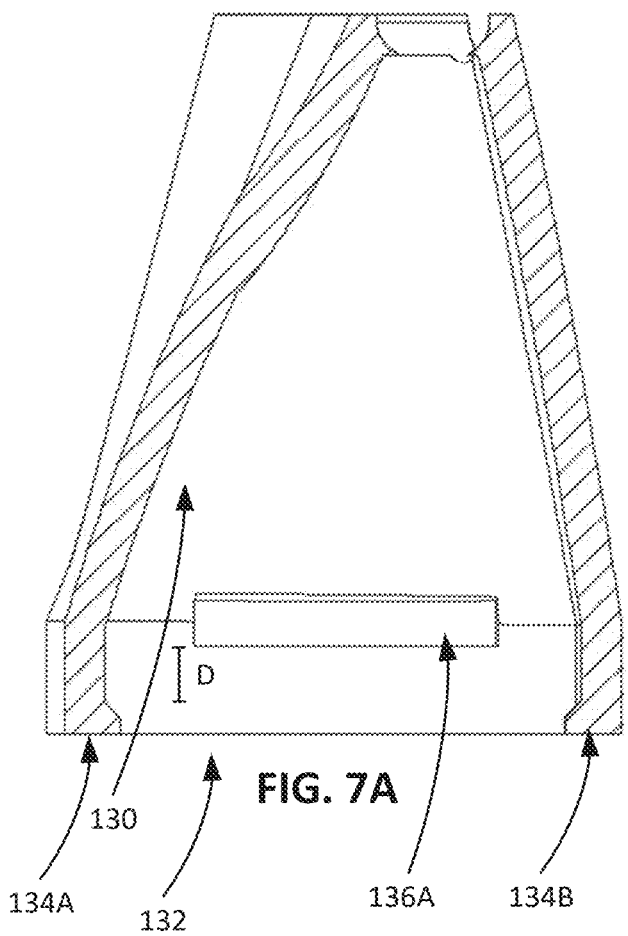
FIGS. 7A and 7B are cross-sectional views of the cover of FIG. 2.
Figure 7B:
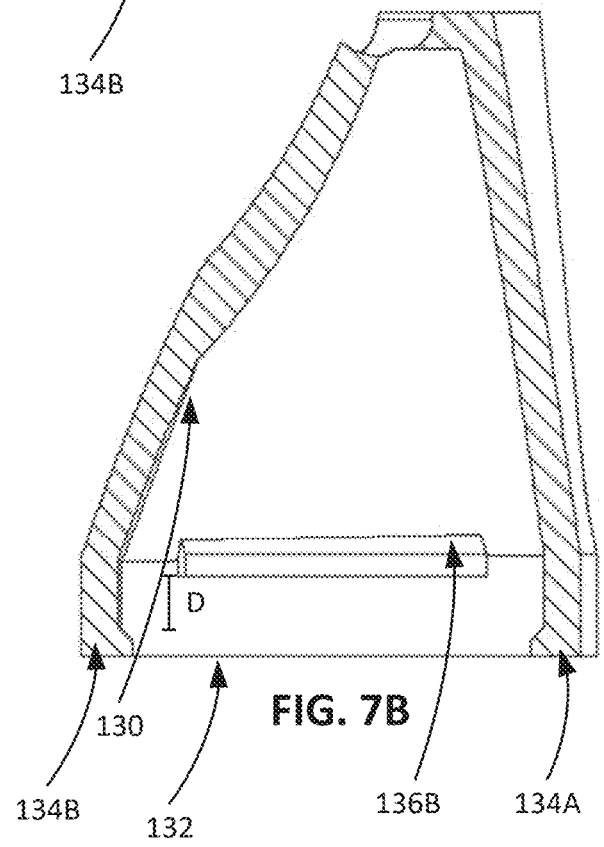

In an embodiment, the lower stops 134A and 134B may be at or proximate the lowermost portion of the bottom portion 110 and the upper stops 136A and 136B may be at or proximate the uppermost portion of the bottom portion 110 (i.e., the upper stops 136A and 136B may be in a different vertical plane relative to the lower stops 134A and 134B). Thus, the lower stops 134A and 134B may be proximate the entryway 132 relative to the upper stops 136A and 136B (FIGS. 7A-7B). For example, there may be a vertical distance D between the lower stops 134A, 134B and the upper stops 136A, 136B.

In some examples, the lower stops 134A and 134B may be generally rectangular and may be identical. In other examples, the lower stop 134A may be disparate from lower stop 134B and these stops may take on any regular or irregular shape. The upper stops 136A and 136B may likewise be generally rectangular and may be identical. In other examples, the upper stop 136A may be disparate from upper stop 136B and these stops may take on any regular or irregular shape. Each of the lower stops 134A and 134B and the upper stops 136A and 136B may extend into the chamber 130 generally laterally from the respective bottom portion wall with which the stops are associated. In some examples, instead of a pair of lower stops 134A and 134B and a pair of upper stops 136A and 136B, a solitary lower stop and/or a solitary upper stop may be provided. In other examples, instead of a pair of lower stops 134A and 134B and a pair of upper stops 136A and 136B, the cover 100 may have a different number of stops, such as 3 stops, 4 stops, 5 stops to N stops.

In some examples of the disclosure, the cover 100 may be formed from elastomeric material. In certain aspects of the embodiments, cover 100 may be additively manufactured using elastomeric material. Additively manufacturing the cover 100 using elastomeric material may provide one or more benefits over manufacturing the cover 100 using conventional techniques (e.g., molding, which requires the manufacture of a tool prior to manufacturing the part). Additively manufacturing the cover 100 using elastomeric material may ensure that the cover 100 is flexible and conforms to the surfaces of the blade 10 being protected by the cover 100. Due to its elastomeric material construction, the bottom portion 110 of cover 100 may be stretched to allow the airfoil 12 to be inserted into the chamber 130. Further, cover 100 manufactured using elastomeric material may be far less likely to damage the blade 10 when it contacts the blade 10 relative to a stiff or abrasive material.

In an example of the disclosure, cover 100 may be additively manufactured using silicone elastomers having a shore hardness in a range between about 50 and about 90 A. In some examples, IND402 from Loctite® may be used to additively manufacture cover 100. In other examples, elastomeric three-dimensional printable polymers (e.g., resins, pellets, filaments, powders, and similar materials) that provide a minimum shore hardness of about 75 A and a minimum tear strength of about 28 kN/m may be used to additively manufacture the cover 100. Using elastomers with a shore hardness between in a range between about 50 and about 90 A and a minimum tear strength of about 28 kN/m may ensure that the cover 100 is suitably flexible to accept the airfoil 12 of the blade 10 without undue effort and is durable enough to withstand forces and materials that would have otherwise caused damage to the airfoil 12. Further, the relatively higher rebound characteristics of such elastomers may allow for these elastomers to readily withstand externally applied shock (e.g., from a tool or the surface of a station) that may otherwise have transferred to and damaged the blade 10.

Another benefit of additively manufacturing the cover 100 using elastomeric material may be that the cover 100 may be secured to the blade 10 without screws, nuts and bolts, or other such fasteners that require tools (such as screw drivers or pliers) for fastening. Covers that require tools, including, but not limited to, screws, nuts and bolts, or other such fasteners (collectively, screws) have a high likelihood of being damaged if the screws are over-tightened, and conversely, may not effectively cover the blade 10 if the screws are not appropriately tightened. The cover 100 as embodied by the disclosure is a "toolless" cover 100, because of its design and elastomeric construction, may provide a conformal boot for selectively and effectively covering one or more portions of the blade 10.

Figure 2:
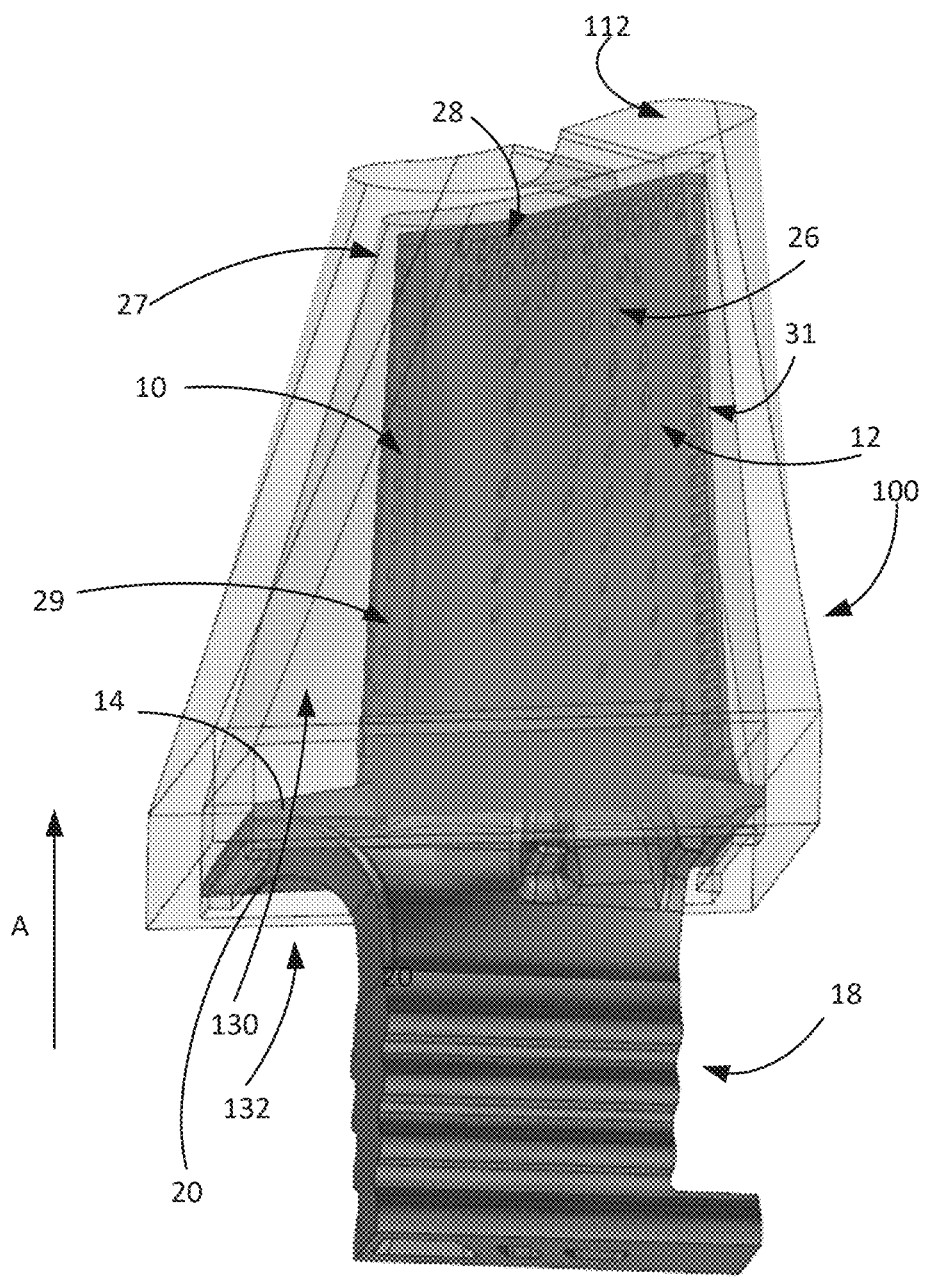
FIG. 2 is a schematic showing a portion of a blade being covered by a protective cover, according to an aspect of the disclosure.

Focus is directed to FIG. 2. Once the cover 100 is manufactured, e.g., using additive manufacturing techniques, it may be used to protect the blade 10 during finishing. Specifically, the tip 28 of the airfoil 12 of the blade 10 may be pushed into the chamber 130 of the cover 100 in a direction A towards the top portion 112 of the cover 100 such that the tip 28 is proximate and adjacent the interior surfaces of the top portion 112 (i.e., the interior surfaces 114I, 116I, and 118I of the first section 114, the second section 116, and the recessed portion 118). When so positioned, the pressure side 26 and suction side 27 of the airfoil 12 may be adjacent one or more of the interior surfaces 102I, 104I, 106I, and 108I of the walls 102, 104, 106, and 108.

Figure 8A:
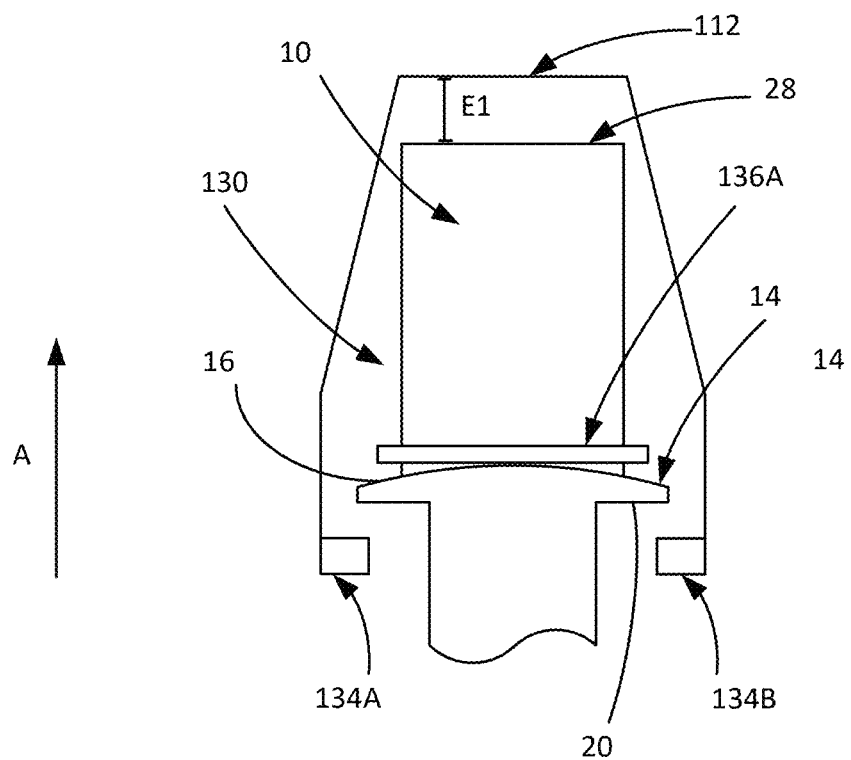
FIGS. 8A and 8B are schematics showing a blade being retained in the cover of FIG. 2.

The upper stops 136A and 136B may function to prevent over-insertion of blade 10 into cover 100. Stops 136A and 136B may ensure that the tip 28 of the blade 10 is spaced apart from and does not contact the interior surfaces of the top portion 112, thus interior surfaces 114I, 116I, and 118I of first section 114, second section 116, and recessed portion 118 are not in contact with tip 28 of blade 10. FIG. 8A is a schematic illustration and shows the blade 10 being inserted into the chamber 130. As can be seen, as the blade 10 is inserted into the chamber 130 in direction A, the upper stops 136A (and 136B, which is not visible in FIG. 8A) may abut the gas path side surface 14 of the platform 16 and preclude the blade 10 from being further into the chamber 130. In certain aspects of the embodiments, either blade 10 or cover 100 may be moved with respect to each other. In some examples, the upper stops 136A and 136B (136B not illustrated for ease of illustration in FIG. 8A) may therefore ensure that the tip 28 of the blade 10 is at least a distance E1 from interior surfaces of the top portion 112 of cover 100. Spacing E1 between the tip 28 of the blade 10 and the top portion 112 of the cover 100 may ensure that an inadvertent force applied to the top portion 112 (e.g., in case the top portion 112 of the cover 100 is inadvertently struck by an object, or where the cover 100 is dropped such that the top portion 112 hits the floor) is not readily transmitted to the tip 28 of the blade 10 and causes damage thereto.

Figure 8B:
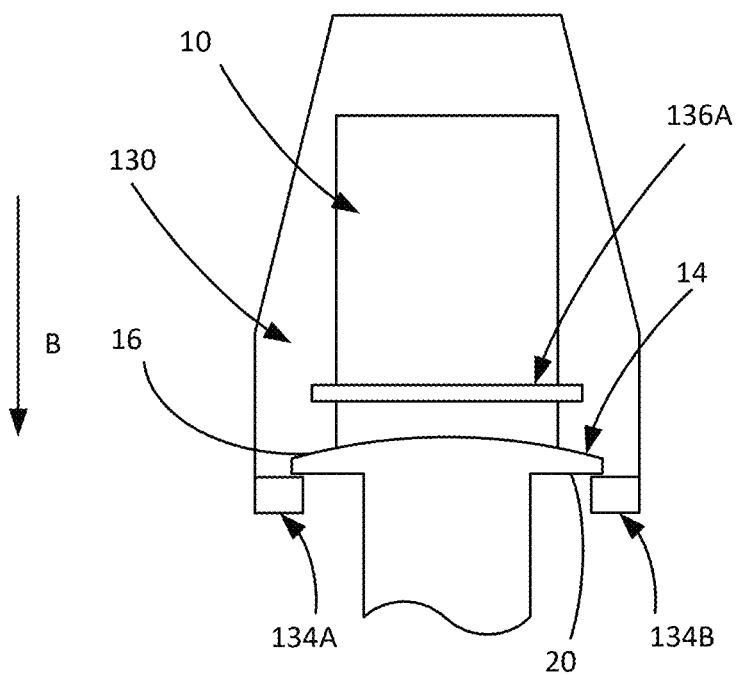

The lower stops 134A and 134B, conversely, may function to prevent unintentional release of the blade 10 from the cover 100 and may ensure that the blade 10, once it is inserted into the cover 100, does not inadvertently fall out of the cover 100 or otherwise disassociate therefrom. Specifically, as shown in FIG. 8B, as gravity or other forces pull the blade 10 inside the cover 100 in direction B, the undersurface 20 of the platform may abut the lower stops 134A and 134B. Accordingly, blade 10 may be precluded from falling out of the cover 100. Thus, the blade 10 may only be disassociated from the cover 100 intentionally (e.g., the blade 10 may manually be pulled out of the cover 100 after stretching open the bottom portion 110) but may not unintentionally disassociate from cover 100. Such may ensure that the cover 100 continues to protect the blade 10 as intended during the finishing processes. Further, because of the elastomeric construction of the upper stops 134A and 134B, and lower stops 136A and 136B, these stops 134A, 134B, 136A, and/or 136B may not impede the airfoil 12 from being pushed into the chamber 130. That is, if the stops 134A, 134B, 136A, and/or 136B come in contact with the airfoil 12 when the blade 10 is being pushed into the cover 100, stops 134A, 134B, 136A, and/or 136B may be pushed aside by the airfoil 12 and may thereafter return to or towards their original position.

Once the blade 10 is inserted into the cover 100, the airfoil 12 and the gas path surface 14 of the platform 16 retained within cover 100 may be protected from damage (e.g., handling damage, foreign contamination damage, et cetera). Because cover 100 does not cover the dovetail 18, an operator may finish (e.g., coat, braze, machine, peen, and otherwise further process) the exposed dovetail 18 while the airfoil 12 and the gas path surface 14 of the platform 16 are protected. As noted, in other embodiments, cover 100 may cover a portion of or the entire the dovetail 18, while another portion or portions of the blade 10 may be exposed for finishing. As illustrated in FIG. 2, the cover 100 may be of unitary construction. In other examples, the cover 100 may include two or more separate or separable portions configured to protect different parts of a component (such as a gas turbine component). In some examples, cover 100 may have one or more windows to allow one or more portions of the blade 10 to be accessed through the cover 100 for finishing.

Figure 9:
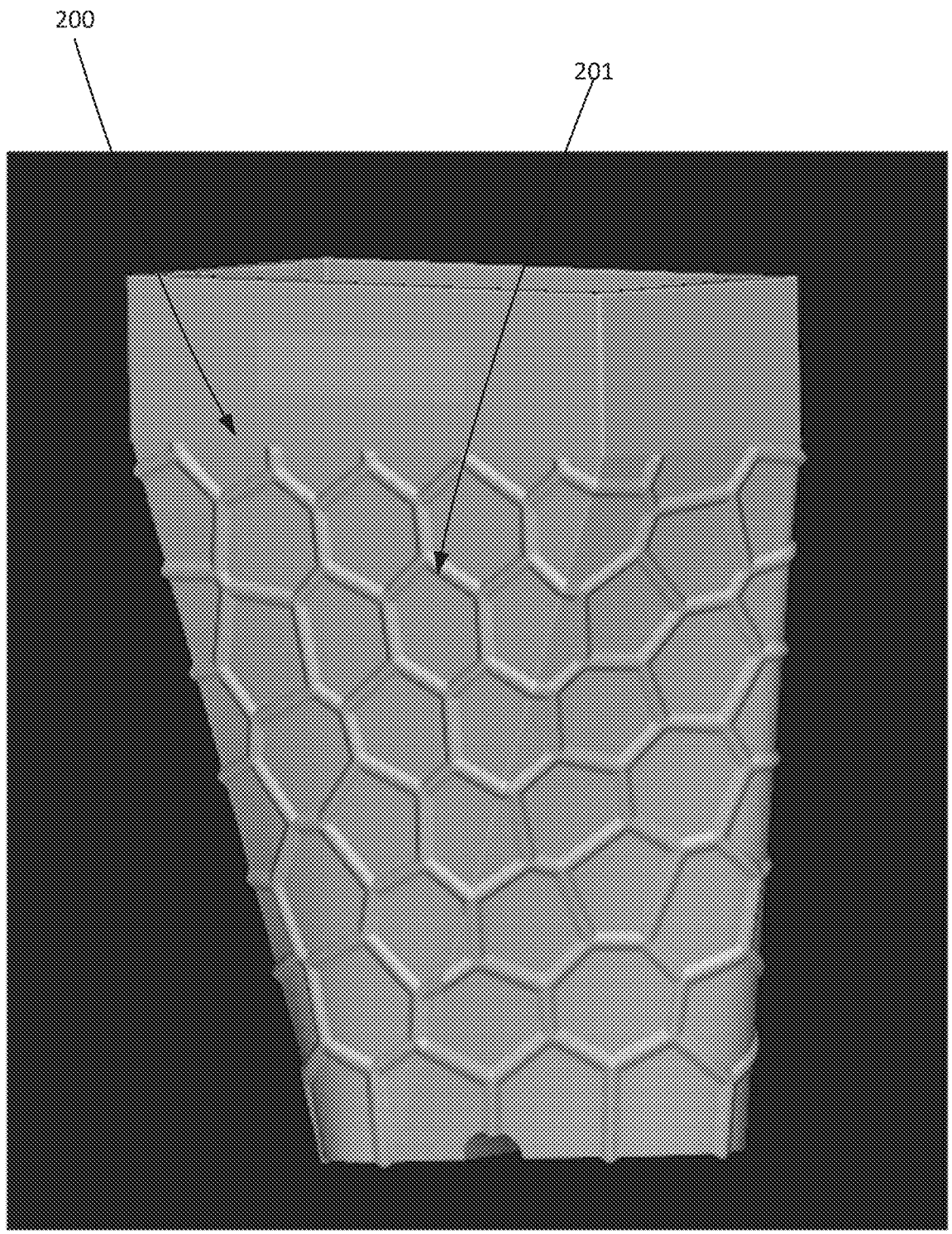
FIG. 9 is a perspective view of a cover, according to an aspect of the disclosure.

FIG. 9 shows a cover 200 in another aspect of the disclosure. The cover 200 may be similar to cover 100, except as noted. Corresponding parts may be denoted with corresponding reference numerals, though with any noted deviations.

As noted, the cover 100 may be additively manufactured. The cover 200 may likewise be additively manufactured, e.g., using vat photopolymerization or other additive manufacturing process now known or hereinafter developed. A difference between the cover 100 and the cover 200 may be that the cover 200 may include ribbing or texture 201 (hereinafter "ribbing 201"). The ribbing 201 may provide structural integrity to the cover 200, and consequently, may allow the cover 200 to be thinner relative to cover 100 while affording the same or similar level of protection. In addition, the ribbing 201 may provide a textured surface that may facilitate the gripping and handling of the cover 200 by an operator without slippage. The ribbing 201 may be a generally hexagonal pattern as shown or may take on other regular or irregular shapes. For example, in some embodiments, the ribbing 201 may be polygonal, triangular, circular, squared, or may include a pattern that includes two or more symmetric or asymmetric shapes. The ribbing 201 may be unitary with the cover 200 and may be additively manufactured together with the cover 200. While not shown in FIG. 9, the cover 200, like the cover 100, may have a pair of upper stops and lower stops 134A, 134B, 136A, and/or 136B on the interior surfaces of the cover 200. That is, the cover 200 may in examples be identical to the cover 100 except for the inclusion of the ribbing 201 in the cover 200.

As noted, in some examples, the surfaces of the cover 100 and the cover 200 may not precisely mate with the surfaces of the airfoil 12 that are being protected. For example, while the airfoil 12 is within the cover 100 or the cover 200, there may be one or more spaces between the surfaces of the airfoil 12 and the surfaces of the cover 100 or cover 200. Loose correspondence between the airfoil 12 and the cover 100 or 200, as opposed to tight skin-on-skin correspondence between the airfoil 12 and the cover 100 and 200, may allow for more permissive tolerances for the cover 100 or 200. The cover 100 and 200 may therefore be fabricated using additive manufacturing processing with consumer level printers, as opposed to high-end commercial additive printers that may be required to manufacture blade covers with tight tolerances.

Figure 10:
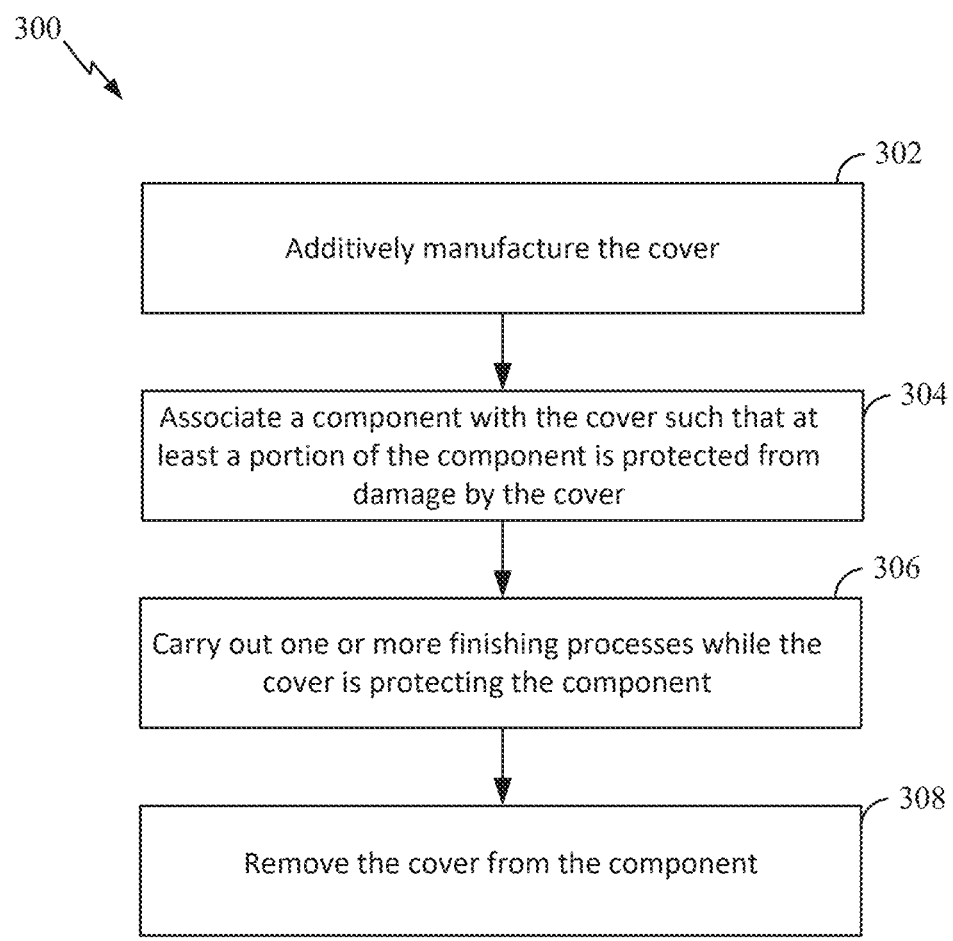
FIG. 10 is a flowchart illustrating a method of making and using the cover of FIG. 2 and FIG. 9.

FIG. 10 shows a flowchart illustrating a method 300 of making and using a cover, such as the cover 100 or the cover 200. At step 302, the cover (e.g., cover 100 or cover 200) may be additively manufactured. At step 304, a component may be associated with the cover such that at least a portion of the component is protected by the cover. For example, the airfoil 12 of the blade 10 may be placed inside the cover 100 or cover 200 for protection. At step 306, one or more finishing processes may be carried out to the exposed portions of the component while the remainder component is protected by cover 100 or cover 200. For example, the exposed dovetail 18 of the blade 10 may be coated, machined, deburred, or otherwise finished while the airfoil 12 is shielded by the cover 100 or cover 200. Once the finishing is complete, the component (e.g., blade 10) may be disassociated from the cover 100 or cover 200 at step 308. If required, the portion of the component that was shielded by the cover 100 or 200 may now be finished to prepare the component for operation.

Thus, as has been described, cover 100 and cover 200 may protect one or more portions of a component while one or more exposed portions of the component undergo one or more finishing processes.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The disclosure claimed is:

1. A unitary cover for a gas turbine component, the unitary cover comprising:
a unitarily constructed cover for the gas turbine component, the unitarily constructed cover including:
a top portion;
a bottom portion;
at least one wall extending from the top portion to the bottom portion;
a chamber accessible via the bottom portion, the chamber configured to retain the component such that at least a part of the component is protected by the unitary cover; and
a first stop and a second stop each extending into the chamber, the first stop and the second stop disposed in different vertical planes;
wherein:
the unitary cover includes an elastomeric material;
each of the first stop and the second stop are disposed on the bottom portion;
the first stop includes a first lower stop and a second lower stop, the first lower stop facing the second lower stop;
the second stop includes a first upper stop and a second upper stop, the first upper stop facing the second upper stop; and
the at least one wall includes a plurality of walls, each of the first lower stop, the second lower stop, the first upper stop, and the second upper stop being disposed on a different one of the plurality of walls.

2. The unitary cover of claim 1, wherein the unitary cover is additively manufactured.

3. The unitary cover of claim 2, wherein the gas turbine component is at least one of a blade and a vane.

4. The unitary cover of claim 1, wherein the top portion includes a first section, a second section, and a recessed portion between the first section and the second section.

5. The unitary cover of claim 4, wherein:
at least one of the first section and the second section is frusto-ovalur; and
the recessed section includes a cutout.

6. The unitary cover of claim 1, wherein the bottom portion includes a parallelogram configuration.

7. The unitary cover of claim 1, wherein the at least one wall includes ribbing.

8. An additively manufactured unitary cover for a blade of a gas turbine, the unitary cover comprising:
a unitarily constructed cover including:
a top portion corresponding to a tip of the blade;
a bottom portion;
at least one wall extending from the top portion to the bottom portion;
a chamber accessible via the bottom portion, the chamber configured to retain the blade such that at least a part of the blade is protected by the unitary cover; and
a first stop and a second stop each extending into the chamber, the first stop and the second stop disposed in different vertical planes.

9. The additively manufactured unitary cover of claim 8, wherein the at least a part of the blade protected by the unitary cover includes an airfoil and a gas path surface of a platform of the blade.

10. The additively manufactured unitary cover of claim 9, wherein the first stop includes a first lower stop and a second lower stop, the first lower stop facing the second lower stop.

11. The additively manufactured unitary cover of claim 8, wherein the second stop is configured to maintain a distance between the tip of the blade and the top portion.

12. The additively manufactured unitary cover of claim 8, wherein when the blade is retained in the chamber, a dovetail of the blade is exposed.

13. A unitary cover for a gas turbine component, the unitary cover comprising:
   a unitarily constructed cover for the gas turbine component, the unitarily constructed cover including:
      a top portion;
      a bottom portion;
      at least one wall extending from the top portion to the bottom portion;
      a chamber accessible via the bottom portion, the chamber configured to retain the component such that at least a part of the component is protected by the unitary cover; and
      a first stop and a second stop each extending into the chamber, the first stop and the second stop disposed in different vertical planes;
   wherein:
      the unitary cover includes an elastomeric material;
      the first stop is configured to contact the component to preclude the component from falling out of the unitary cover;
      the second stop is configured to contact the component to maintain a distance between the component and the top portion.

14. A unitary cover for a gas turbine component, the unitary cover comprising:
   a unitarily constructed cover for the gas turbine component, the unitarily constructed cover including:
      a top portion;
      a bottom portion;
      at least one wall extending from the top portion to the bottom portion;
      a chamber accessible via the bottom portion, the chamber configured to retain the component such that at least a part of the component is protected by the unitary cover; and
      a first stop and a second stop each extending into the chamber, the first stop and the second stop disposed in different vertical planes;
   wherein:
      the unitary cover includes an elastomeric material; and
      the at least one wall includes four walls.

15. The unitary cover for a gas turbine component of claim 14, wherein the at least one wall includes ribbing.

16. A unitary cover for a gas turbine component, the unitary cover comprising:
   a unitarily constructed cover for the gas turbine component, the unitarily constructed cover including:
      a top portion;
      a bottom portion;
      at least one wall extending from the top portion to the bottom portion;
      a chamber accessible via the bottom portion, the chamber configured to retain the component such that at least a part of the component is protected by the unitary cover; and
      a first stop and a second stop each extending into the chamber, the first stop and the second stop disposed in different vertical planes;
   wherein:
      the unitary cover includes an elastomeric material; and
      the top portion includes a first section, a second section, and a recessed section between the first section and the second section.

17. A unitary cover for a gas turbine component, the unitary cover comprising:
   a unitarily constructed cover for the gas turbine component, the unitarily constructed cover including:
      a top portion;
      a bottom portion;
      at least one wall extending from the top portion to the bottom portion;
      a chamber accessible via the bottom portion, the chamber configured to retain the component such that at least a part of the component is protected by the unitary cover; and
      a first stop and a second stop each extending into the chamber, the first stop and the second stop disposed in different vertical planes;
   wherein:
      the unitary cover includes an elastomeric material; and
      the bottom portion includes a parallelogram configuration.

\* \* \* \* \*